United States Patent [19]

Tanikella et al.

[11] B 4,001,189

[45] Jan. 4, 1977

[54] FIBERS OF ACID-DYEABLE POLYESTER HAVING TETRAMETHYLPIPERIDINE GROUPS ATTACHED THROUGH OXYALKALENE LINKAGES TO ENDS OF POLYMER CHAINS

[75] Inventors: Murty S. Tanikella, Newark, Del.; Odorich von Susani, Geneva, Switzerland

[73] Assignee: E. I. Du Pont de Nemours and Company, Wilmington, Del.

[22] Filed: Mar. 19, 1975

[21] Appl. No.: 559,700

[44] Published under the second Trial Voluntary Protest Program on March 23, 1976 as document No. B 559,700.

Related U.S. Application Data

[63] Continuation-in-part of Ser. No. 505,953, Sept. 13, 1974, abandoned.

[30] Foreign Application Priority Data

Sept. 17, 1973 Germany ............................ 2346734

[52] U.S. Cl. ............................... 260/75 N; 260/77
[51] Int. Cl.$^2$ ........................................ C08G 63/68
[58] Field of Search ........................... 260/75 N, 77

[56] References Cited

UNITED STATES PATENTS

| 2,647,104 | 7/1953 | Shivers | 260/75 |
| 3,352,872 | 11/1967 | Cislak et al. | 260/293.63 |
| 3,372,143 | 3/1968 | Terada et al. | 260/47 |
| 3,624,181 | 11/1971 | Munakata et al. | 260/860 |
| 3,684,765 | 8/1972 | Matsui et al. | 260/45.8 |

FOREIGN PATENTS OR APPLICATIONS 32,434   8/1972   Japan

*Primary Examiner*—Donald E. Czaja
*Assistant Examiner*—H. H. Fletcher

[57] ABSTRACT

Textile fibers or filaments prepared from polyesters modified with a minor proportion of 2,2,6,6-tetramethylpiperidine groups attached through oxyalkylene linkages to ends of linear polyester polymer chains have improved dyeability with acid dyes. A variety of alkylene oxide condensates of tetramethylpiperidine compounds are shown to have adequate heat-stability and compatibility for incorporating in polyesters under conditions of condensation polymerization to form desirable products.

10 Claims, No Drawings

FIBERS OF ACID-DYEABLE POLYESTER HAVING TETRAMETHYLPIPERIDINE GROUPS ATTACHED THROUGH OXYALKALENE LINKAGES TO ENDS OF POLYMER CHAINS

REFERENCE TO RELATED APPLICATION

This is a continuation-in-part of application Ser. No. 505,953 filed Sept. 13, 1974, now abandoned.

This invention relates to textile fibers and filaments of linear terephthalate polyesters, and is more particularly concerned with products of polyesters modified with basic nitrogen-containing groups to provide improved dyeability with acid dyes.

Although many methods have been tried for improving the acid-dyeability of such polyester fibers and filaments, the present invention has been found to provide important improvements. In order to provide good dyeability with acid dyes, it has been found that the modifier should contain a highly basic nitrogen atom which is suitably positioned as a dye site, but which does not form a reactive center for polymer degradation reactions. That is, the basic modifier should be compatible with the polyester and not result in objectionable discoloration or inadequate molecular weight. The modifier should have sufficient thermal stability for incorporation in the polyester during condensation polymerization or melt-spinning into filaments. The amount of modifier required for good dyeability should not be so great as to dilute desirable physical properties of the polyester, and the modifier should have low volatility to prevent escape, e.g., with low-boiling compounds removed during formation of the polyester. The melt-spun filaments preferably retain a high level of dyeability when subjected to heat-setting treatment after drawing. The dyed filaments and fibers should have good resistance to dye removal by washing or dry cleaning.

SUMMARY OF THE INVENTION

The present invention provides improved acid-dyeable textile fibers and filaments of linear terephthalate polyester modified with a minor proportion, sufficient to provide at least 0.02 weight percent nitrogen based on the weight of modified polyester, of 2,2,6,6-tetramethylpiperidine groups attached through oxyalkylene linkages to terephthalate units at the ends of polyester chains, the linkages to the tetramethylpiperidine group being at the 1 or 4 positions of the tetramethylpiperidine ring. The oxyalkylene linkages consist of oxyethylene units, or oxyethylene and oxypropylene units, there being an average of at least about 10 oxyalkylene units per tetramethylpiperidine group of which at least 5 are oxyethylene units. Any of the polyesters known to be useful in textile fibers or filaments can be modified by this invention to impart good acid-dyeability. By "acid-dyeable" is meant that the filaments have an affinity for acid dyes.

The tetramethylpiperidine groups may be attached at one end (or both ends) of polyester chains as illustrated by one of the following formulas:

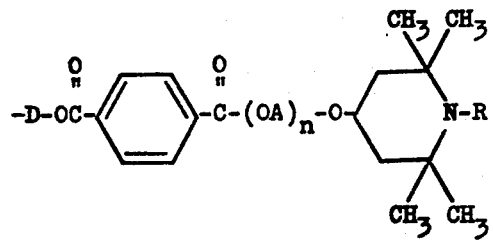

or 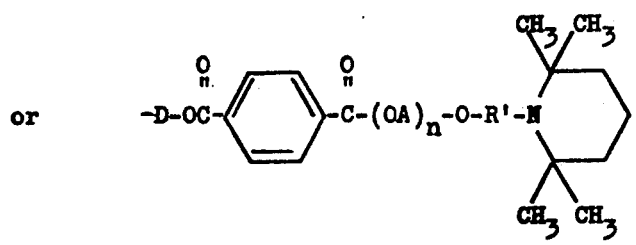

wherein

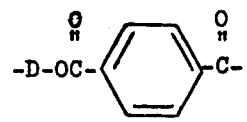

represents a portion of a linear polyester chain having a terephthalate unit at the end; $-(OA)_n-$ represents a divalent group of n oxyalkylene units which averages at least about 10 units; R represents hydrogen or a hydrocarbon group of up to 18 carbon atoms; and $-R'-$ is an aliphatic, divalent hydrocarbon group of 2 to 18 carbon atoms. R and R' are free from aliphatic unsaturation.

The modified polyester preferably comprises at least 85 mole percent ethylene terephthalate polymer units, and may also comprise up to 10 weight percent ethylene adipate or ethylene glutarate polymer units. It is preferably modified with ethylene oxide condensates of a 1-lower alkyl-2,2,6,6-tetramethyl-4-hydroxypiperidine. By "lower alkyl" is meant alkyl groups having 1 to 4 carbon atoms.

Preferably, an amount of modifier is used which provides 0.02 to 0.25 weight percent nitrogen, based on the weight of the modified polyester. In general, there are an average of 10 to 80 oxyalkylene units per tetramethylpiperidine group in the modifier, and an average number between 10 and 40 is preferred. The 2,2,6,6-tetramethylpiperidine group is preferably attached to said terephthalate units through the 4 position of the tetramethylpiperidine ring.

DETAILED DESCRIPTION

The acid-dyeable polyester fibers and filaments of this invention are characterized by the presence of 2,2,6,6-tetramethylpiperidine groups attached through oxyalkylene groups to at least some of the polyester molecules. These acid-dyeable polyesters have surprisingly good dyeability and are free from undesirable discoloration. This unexpected achievement is believed to be due, at least in part, to the high basicity of the piperidine nitrogen atom, which leads to strong dye-polymer interactions; to the presence of the 2,2,6,6-tetramethyl substituents on the piperidine ring, which hinders the approach of reactive centers that cause polymer degradation reactions (for example, discoloration and quaternization reactions); and to increased hydrophilicity of the polymer system in the vicinity of the dyesite, which facilitates dyeing in aqueous dye baths.

Nitrogen-containing compounds for preparing modified polyesters of the present invention are alkylene oxide condensates of a 2,2,6,6-tetramethylpiperidine compound having a hydroxyl group at the 4-position or on a hydrocarbon group at the 1-position of the ring. These alkylene oxide condensates can be prepared by known procedures, preferably as illustrated subsequently for representative compounds. Preferably, the alkylene oxide is ethylene oxide or a combination of alkylene oxides in which ethylene oxide constitutes at least half of the alkylene oxides. Mixed alkylene oxides can be used, or condensation can be carried out with one alkylene oxide to add a given amount of oxyalkylene units and then a different alkylene oxide is used for further condensation. The reaction of the alkylene oxide or oxides with the tetramethylpiperidine alcohol used is catalyzed with a catalyst such as sodium hydride, potassium hydride or lithium aluminum hydride. The condensation reaction produces a mixture of compounds having various numbers of oxyalkylene units and such mixtures are characterized by stating an average number of oxyalkylene units.

The alkylene oxide condensate of the tetramethylpiperidine alcohol may be reacted with preformed polyester, or it may be added at a suitable time during formation of the polyester, to provide products having tetramethylpiperidine groups attached through oxyalkylene linkages to terephthalate units at the ends of polyester chains. The high molecular weight oxyalkylene condensates of this invention are significantly less volatile than the tetramethylpiperidine alcohols and fewer precautions are needed to prevent their escape; they also provide a surprising improvement in dyeability. The condensate should have an average of at least about 10 oxyalkylene units. An average of more than about 80 oxyalkylene units is usually undesirable because of the large amount of modifier which would be required in a polyester to provide enough nitrogen dye-sites. Preferably, the average number of units is between 10 and 40, and most preferably between 18 and 30. Preferably at least 50 percent of the oxyalkylene units are oxyethylene units. The nitrogen content of the acid-dyeable polyesters should be at least 0.02 percent by weight, based on the weight of the modified polymer. Preferably, the weight percent of tetramethylpiperidine nitrogen will be 0.02 to 0.25 percent, and more preferably 0.05 to 0.15 percent.

In general, polyester compositions prepared with a given tetramethylpiperidine compound will have increasing dyeability with increasing nitrogen content, with increasing oxyethylene content at constant nitrogen content, and with increasing content of a conventional copolymerizable compound. The acid-dyeable fibers and filaments of this invention that can be acid dyes at a pH of 3.5 and above are preferred embodiments and those that can be dyed at a pH of 4.5 and above are especially preferred. Of course, lower pH values, e.g., 3.0, can be used when desired.

The tetramethylpiperidine modifier compounds used in this invention exhibit adequate thermal stability at elevated temperatures, e.g., at melt-spinning temperatures within the range of 240°–300°C. When the tetramethylpiperidine compound is added to polyester-forming compositions, it should be able to withstand temperatures on the order of 280°C and up, since such temperatures are required for efficient polymer production. In addition, modifier compounds used to provide the acid dye sites must be compatible with polyesters. The polyester compatibility of the modifier compounds containing the 2,2,6,6-tetramethylpiperidine group has been found to be surprisingly good. These modifier compounds can be reacted with polyesters or polyester-forming compositions at elevated temperatures without the development of objectionable discoloration or adverse reduction of molecular weight. The alkylene oxide condensates react and become part of the polymer molecule; they cannot be removed by washing, dry cleaning, and the like.

By polyesters is meant fiber-forming linear condensation polymers characterized by carbonyloxy linking radicals

in the polymer chain. In the absence of an indication to the contrary, a reference to polyesters is meant to encompass copolyesters, i.e., polyesters made using 3 or more reactants, each having 2 ester-forming groups. The polyesters may, if desired, contain additives, e.g., delustrants, viscosity boosters, optical brighteners, toning pigments, antioxidants, and the like. In addition, filaments prepared from these polymers may encompass various cross-sectional configurations such as round, multilobal or hollow.

Examples of linear, fiber-forming condensation polyesters that can be modified in accordance with the present invention are poly(ethylene terephthalate), poly(trimethylene terephthalate), poly(2,2-dimethylpropylene terephthalate), poly(tetramethylene terephthalate), poly(ethylene terephthalate/isophthalate) (85/15), poly(ethylene terephthalate/hexahydroterephthalate) (90/10), poly(hexahydro-p-xylene terephthalate), poly(ethylene/hexahydro-p-xylyene terephthalate), terephthalate copolyesters containing an aliphatic dicarboxylic acid constituent (especially terephthalate/adipate and terephthalate/glutarate copolyesters) and terephthalate copolyesters containing a branched-chain glycol constituent (especially ethylene/2,2-dimethylpropylene terephthalate copolyesters). The modified terephthalate copolyesters are a preferred embodiment of the present invention.

This invention is also important with respect to providing acid-dyeable fibers of copolyesters containing at least 85 mol percent of ethylene terephthalate units, since filaments of copolyesters such as, for example, terephthalate/adipate copolyesters retain a relatively high level of their dyeability when subjected to heat-setting treatments after they have been drawn.

As indicated above, polymer compositions containing the 2,2,6,6-tetramethylpiperidine group are basic compounds and, as such, have a relatively high affinity for acid dyes and can be dyed in a range of colors. As illustrations of such acid dyes, there may be mentioned C.I. Acid Blue 25 (C.I. 62055), C.I. Acid Red 4 (C.I. 14710), C.I. Acid Yellow 40 (C.I. 18950), and C.I. Acid Green 25 (C.I. 61570). Fibers of these polymer compositions can be combined with other polyester fibers to provide fabrics that can be dyed to multi-colors in a single dye bath. In general, the dyed fibers of the present invention have a good dye lightfastness.

The dyeability of the filaments of this invention may be determined by measuring the amount of dye left in the dye bath after dyeing in a standard manner. The whiteness of the filaments may be measured by means known to those skilled in the art, for example, reflectance determination using a reflectometer. In general, whiteness will improve as the purity of the compounds used is improved and will improve by following known practices for avoiding degradation and by minimizing the exposure of the compositions to oxygen at elevated temperatures. If desired, toners and brighteners can be added to increase fiber whiteness.

The polyester compositions used in this invention usually have a relative viscosity between 7.5 and 85; preferably the relative viscosity will be from about 11 to about 30. The relative viscosity is determined by measuring the ratio of the viscosity of a solution containing 4.75% by weight of the polymer, in hexafluoroisopropanol containing 100 parts per million, by volume, of concentrated sulfuric acid, to the viscosity of the hexafluoroisopropanol sulfuric acid solvent measured in the same units at 25 ± 0.05°C.

The nitrogen content of the modified polyesters is determined using the micro Kjeldahl method of analysis.

In the procedures and examples that follow, all percentages given are by weight based on total weight except as indicated otherwise, and in the examples all scour and dye baths use a bath-to-sample (fabric, yarn, or skein) weight ratio of 40:1 except as indicated otherwise, and the wetting agent used is octylphenol condensed with 9–10 moles of ethylene oxide. Also, the expression "cut to flake and solid-phase polymerized" means the polymer was cut to flake in an Abbe' rotary cutter (Abbe' Engineering Co., New York, N.Y.) and passes through a perforated metal screen having holes 0.125-inch (0.318 centimeter) in diameter and this flake is solid-phase polymerized by heating it at 190°C. at less than 5 torr, except as indicated otherwise, for the indicated period of time. If the flake is stored, rather than used as prepared, it is dried prior to spinning. Unless otherwise indicated, the dye carrier used in the examples is a composition comprising about 50% methyl p-toluate, 25% methyl benzoate and 25% biphenyl. Filaments prepared in the examples have a low level of color; i.e., while they are not pure white, the color is acceptable for commercial use.

PREPARATION OF TETRAMETHYLPIPERIDINE ALCOHOLS

Representative procedures for preparation of piperidine alcohols used in the practice of this invention are given below:

1,2,2,6,6-Pentamethyl-4-Hydroxypiperidine

A mixture of 18 grams of commercially available 2,2,6,6-tetramethyl-4-hydroxypiperidine, 18 grams of an aqueous solution containing 37% of formaldehyde and 4 milliliters of formic acid containing 1% water is placed in a 100-ml., round-bottomed flask and heated on a steam bath for 7 hours. The contents are cooled, made basic with sodium hydroxide and extracted with ether. The ether extract is dried using anhydrous magnesium sulfate and the ether evaporated. The residue, a white solid, is purified by sublimation at 90°C. at 0.05 torr. The purified 1,2,2,6,6-pentamethyl-4-hydroxypiperidine has a melting point of 70°–71°C.

1-(1-Butyl)-2,2,6,6-Tetramethyl-4-Hydroxypiperidine

Into a 400-milliliter Hastalloy pressure tube are placed 62.8 grams of 2,2,6,6-tetramethyl-4-hydroxypiperidine and 35.6 grams of 1-bromobutane. The tube and contents are cooled to −78°C., evacuated and filled with nitrogen. The tube is sealed, shaken and warmed to 100°C. for 1 hour, 120°C. for 1 hour and 150°C. for 30 hours. The tube is cooled and the solid charge is removed and placed in a Soxlet extraction apparatus. The material is extracted for 8 hours with diethyl ether. The resulting ether solution is treated with activated charcoal, filtered and concentrated under vacuum. The residue is distilled at 120°–125°C. at 1 torr to give 26 grams of 1-(1-butyl)-2,2,6,6-tetramethyl-4-hydroxypiperidine, a white solid melting at 29°–33°C.

1-(2-Hydroxyethyl)-2,2,6,6-Tetramethylpiperidine

Into a dry, stainless steel bomb having a volume of 400 milliliters, is placed 100 grams of 2,2,6,6-tetramethylpiperidine. The bomb is cooled to −78°C., evacuated, filled with nitrogen and re-evacuated. The bomb is placed on a scale and is attached, with flexible connection, to a source of ethylene oxide. Ethylene oxide is then passed into the bomb until 40 grams are added. The bomb is sealed and disconnected from the ethylene oxide source and is heated 1 hour at 100°C., 1 hour at 110°C., 1 hour at 120°C. and 8 hours at 155°–160°C. The discharged weight of solid white product is 131 grams.

The crude product is dissolved in ether, activated charcoal is added and the suspension is boiled for 5 minutes to remove colored impurities. The solution is filtered and cooled. On filtering the cooled solution, there is obtained 1-(2-hydroxyethyl)-2,2,6,6-tetramethylpiperidine as white needles melting at 93° to 94°C.

PREPARATION OF ALKYLENE OXIDE CONDENSATES OF TETRAMETHYLPIPERIDINE ALCOHOLS

Representative procedures for preparation of tetramethylpiperidine condensates used in the practice of this invention are given below.

1,2,2,6,6-Pentamethyl-4-Hydroxypiperidine Condensed With Ethylene Oxide in a Molar Ratio of 1:10 — (PHP-10EO)

RUN I

Into a 1-liter glass flask, equipped with a reflux condenser, a thermometer and reactant inlets, is placed 172 grams of 1,2,2,6,6-pentamethyl-4-hydroxypiperidine. The flask is heated to 72°C. and is swept with nitrogen. Then 0.25-gram of sodium hydride dispersed in 0.25-gram of mineral oil is added and the temperature is increased to 130°–140°C. After the addition of 100 grams of ethylene oxide, the temperature is raised to 160°C. and another 340 grams of ethylene oxide are added over a period of 2–3 hours. The reaction catalyst is then quenched with 0.625-milliliter of glacial acetic acid. A slightly yellow, viscous liquid is obtained. This liquid has a neutral equivalent of 608-609 grams which corresponds to an adduct having an average of 10 oxyethylene units. This condensate is referred to as PHP-10EO.

RUN II

A 5-liter flask fitted with a thermometer and a capillary nitrogen inlet is weighed, and 766 grams of a composition consisting mostly of 1,2,2,6,6-pentamethyl-4-hydroxypiperidine is introduced. The setup is warmed to 90°C. and held at 1–2 torr for 0.5-hour to remove water and volatile acidic components, such as carbon dioxide. The charge is cooled and reweighed; the charge residue weighs 742 grams. A mechanical stirrer and bearing is inserted in the center neck, and a gas feed tube is inserted in place of the nitrogen bleed. The setup is then re-tared. A vertical condenser having a bubbler attached to its exit tube is then attached to the flask. The apparatus is purged with nitrogen for 10 minutes, and then heated to a temperature of 80°C. to remelt the residue. With the temperature below 90°C., 1.08 grams of sodium hydride dispersed in 1.08 grams of mineral oil is added. Ethylene oxide gas is added to the stirred liquid at such a rate that no gas passes through the bubbler. The weight loss of the ethylene oxide cylinder is used as a rough measure of the amount of ethylene oxide added, but the molecular composition is calculated on the basis of the weight of flask and contents after addition. After the addition is complete, the flask is swept with nitrogen and cooled below 50°C. The condenser is removed and the flask weighed. The weight gain is 1914 grams, giving a product having a calculated average of 10.1 oxyethylene units. Acetic acid (2.7 grams) is then added and the mixture is stirred for 10 minutes to quench the catalyst. The product is found to have a neutral equivalent of 623 and is referred to as PHP-10.1EO.

1,2,2,6,6-Pentamethyl-4-Hydroxypiperidine Condensed With Ethylene Oxide in a Molar Ratio of 1:20 (PHP-20EO)

This condensate is prepared in the manner described for PHP-10.1EO. The charge residue weighs 523 grams and 1.52 grams of the sodium hydride dispersion, 2,719 grams of ethylene oxide and 1.9 grams of acetic acid are used. The product is a low-melting, waxy material that is calculated to contain 20.3 oxyethylene units. It is referred to as PHP-20EO.

1,2,2,6,6-Pentamethyl-4-Hydroxypiperidine Condensed With Ethylene Oxide in a Molar Ratio of 1:74 (PHP-74EO)

Using the apparatus and procedure described for preparing PHP-10.1EO, 1,2,2,6,6-pentamethyl-4-hydroxypiperidine is stripped to remove water and volatile acidic impurities. The weight of the stripped charge is 88.5 grams. The apparatus is then set up for the addition of ethylene oxide as described for PHP-10.1EO. The charge is purged with nitrogen and 0.25-gram of the sodium hydride dispersion is added. Ethylene oxide, 1142 grams, is added, as determined by weight gain of the apparatus. One half of the charge is removed, and 0.1-gram of the sodium hydride dispersion and 267 grams of ethylene oxide is added to the remainder. Again, the weight of ethylene oxide is determined by weighing the apparatus before and after the addition. The product is calculated to have an average of 74 oxyethylene units, is found to have a neutral equivalent of 3350 and is referred to as PHP-74EO. The catalyst is quenched by stirring in 0.25-milliliter of acetic acid.

1,2,2,6,6-Pentamethyl-4-Hydroxypiperidine Condensed With Two Alkylene Oxides in a Molar Ratio of 1:10 (PHP-5PO-5EO)

Using the apparatus and conditions described for PHP-10.1EO, 1,2,2,6,6-pentamethyl-4-hydroxypiperidine is stripped of water and volatile acidic components. The charge is cooled and the flask and contents are re-weighed; the charge is found to weigh 176 grams. The nitrogen bleed is removed and the flask is re-tared and equipped with a stirrer, a Dewar condenser filled with a mixture of dry ice and acetone and topped with an oil-filled bubbler and a pressure-relieving dropping funnel; the thermometer is removed and re-inserted through an adapter provided with a side-arm through which nitrogen can be passed. The flask is purged with nitrogen and 0.25-gram of sodium hydride in 0.25-gram of mineral oil added. The flask is heated to 150°–170°C. and 1,2-propylene oxide is added to the stirred charge from the dropping funnel at such a rate that only a slow reflux develops. When no further reflux is noted after completing the addition, the charge is cooled under a nitrogen sweep. The flask is weighed and the amount of propylene oxide added is found to be 288 grams. The cooled charge is transferred to the apparatus used for PHP-10.1EO and ethoxylated as described for PHP-10.1EO. The amount of ethylene oxide added is found to be 220 grams. Acetic acid, 0.624-gram, is added and the charge stirred 10 minutes to quench the catalyst. The product is calculated to contain an average of 4.88 oxypropylene units and 4.9 oxyethylene units and is found to have a neutral equivalent of 660. The product contains blocks of two different oxyalkylene units and is referred to as PHP-5PO-5EO.

1,2,2,6,6-Pentamethyl-4-Hydroxypiperidine Condensed With Two Alkylene Oxides in a Molar Ratio of 1:10 (PHP-5EO-5PO)

One mole, 172 grams, of 1,2,2,6,6-pentamethyl-4-hydroxypiperidine, which has been stripped of volatile acidic components as described for PHP-10.1EO, is treated with 0.25-gram of sodium hydride dispersed in 0.25-gram of mineral oil and then with 213.5 grams of ethylene oxide. The cooled charge is then tared with the gas-feed tube removed. The flask is equipped with a stirrer, a side-arm adapter for the thermometer, a pressure-relieving dropping funnel, a Dewar condenser filled with a mixture of dry ice and acetone and topped with an oil-filled bubbler. Nitrogen is passed through the side arm to purge the flask and 1,2-propylene oxide is added from the dropping funnel at 150°–170°C. at such a rate that only a slow reflux develops in the condenser. The propylene oxide is added with the volume used to estimate the amount of the addition but with weight gain used in the calculation. The charge is cooled under a nitrogen sweep when the addition is complete and no further reflux is noted. An appropriate weighing shows that 285 grams of propylene oxide is added. Acetic acid, 0.62-gram, is added and the contents stirred to quench the catalyst. The product is calculated to contain 4.85 ethylene oxide units and 4.9 propylene oxide units and is found to have a neutral equivalent of 656. This product is similar to PHP-5PO-5EO but the relative position of the blocks is reversed; it is referred to as PHP-5EO-5PO.

1,2,2,6,6-Pentamethyl-4-Hydroxypiperidine Condensed With Two Alkylene Oxides in a Molar Ratio of 1:10 (PHP-5EO/5PO)

Using the apparatus and conditions described for PHP-10.1EO, 1,2,2,6,6-pentamethyl-4-hydroxypiperidine is stripped of water and volatile acidic components. The charge is cooled and the flask is weighed; the charge is found to weigh 86 grams. The flask is then provided with a thermometer, stirrer, gas-feed tube, pressure-relieving dropping funnel and a Dewar condenser filled with a mixture of dry ice and acetone and topped with an oil-filled bubbler. The flask is then purged with nitrogen and 0.25-gram of sodium hydride in 0.25-gram of mineral oil is added. The charge is heated to 150° to 170°C., and a weighed amount, 145 grams, of propylene oxide is added from the dropping funnel at the same time that ethylene oxide is added through the gas-feed tube. When refluxing ceases, the flask is cooled and weighed and the gain in weight is found to be 261 grams, giving, by difference, a weight of 116 grams of ethylene oxide added. Acetic acid, 0.65-gram, is then stirred in to quench the catalyst. The product is calculated to have an average of 5.3 oxyethylene units and 5.0 oxypropylene units and is found to have a neutral equivalent of 735. The product contains a random mixture of oxyethylene and oxypropylene units and is referred to as PHP-5EO/5PO.

1-Butyl-2,2,6,6-Tetramethyl-4-Hydroxypiperidine Condensed With Ethylene Oxide in a Molar Ratio of 1:14 (BTHP-14EO)

Twenty-six grams of 1-(1-butyl)-2,2,6,6-tetramethyl-4-hydroxypiperidine is ethoxylated using the apparatus described for PHP-10.1EO, except that a 250-milliliter flask is used. The charge is heated to 90°C., nitrogen is passed through for 5 hours, and 0.1-gram of a 50%, by weight, dispersion of sodium hydride in mineral oil is added. The weight of the flask and charge is then determined. The charge is heated to 140°C., ethylene oxide added and the flask swept with nitrogen and weighed. The weight gain shows that 77.5 grams of ethylene oxide is added to give a product calculated to contain 14.4 oxyethylene units. The product is taken up in methanol and 1.5 milliliters of acetic acid is added to quench the catalyst. The solution is treated with activated charcoal and filtered. The solvent is removed at <1 torr at 80° to 90°C. to give a tan, waxy solid. This product is referred to as BTHP-14EO.

1-(2-Hydroxyethyl)-2,2,6,6-Tetramethylpiperidine Condensed With Ethylene Oxide in a Molar Ratio of 1:19 (ETMP-19EO)

Into a 5-liter flask equipped with a thermometer, a mechanical stirrer, a gas-feed tube and a vertical condenser having a bubbler attached to its exit tube, is placed 135 grams of 1-(2-hydroxyethyl)-2,2,6,6-tetramethylpiperidine. The apparatus is weighed, purged with nitrogen and the product melted at 100°C. When the charge is homogeneous, 0.175-gram of sodium hydride in 0.175 gram of mineral oil is added. Ethylene oxide gas is added to the stirred liquid at such a rate that no gas passes through the bubbler. After the addition is complete, the flask is swept with nitrogen, cooled and weighed. It is found that 618 grams of ethylene oxide has been added. The catalyst is then quenched by adding 0.44-gram of acetic acid and stirring for 10 minutes. It is calculated that an average of 19.3 oxyethylene units have been added to the piperidine alcohol. The product is found to have a neutral equivalent of 1,002 and is referred to as ETMP-19EO.

EXAMPLE 1

This example illustrates the use of PHP-10EO in the preparation of acid-dyeable polyester filaments.

PHP-10EO is heated to a temperature of 110°C. and injected, at a level of 2.57 percent, into molten poly(ethylene terephthalate) in a continuous mixer. The poly(ethylene terephthalate) has a relative viscosity of 47. The mixer temperature is 288°C. and the holdup time in the mixer is 7.14 minutes. The treated polymer is then spun into a 34-filament yarn at a block temperature of 283°C. and a spinneret temperature of 274°C. The spun yarn passes directly to a draw zone where it is drawn in two stages. The yarn passes from the feed roll at 413 yards (377 meters) per minute to a steam draw-jet and then to draw rolls at 1792 yards (1646 meters) per minute. The steam used in drawing the yarn is supplied to the jet at a pressure of 50 pounds per square inch (3.52 kilograms per square centimeter) gauge and the temperature in the draw-jet is 225°C. The drawn yarn then passes to a second draw zone and to a second set of draw rolls at a speed of 1,850 yards (1,690 meters) per minute. The second set of draw rolls is heated to 150°C. The yarn then passes over let-down rolls at 1,828 yards (1,668 meters) per minute and is wound up at 1,810 yards (1,657 meters) per minute. The drawn yarn has a denier of 151, a tenacity of 3.4 grams per denier, an elongation of 29%, a relative viscosity of 14.5, and has a nitrogen content of 0.06%. The yarn is knit into fabric.

Two weighed samples of the knit fabric are scoured using the procedure described below. The fabric is placed in an aqueous scour bath containing 1% on weight of fabric (owf) of wetting agent and 1% owf of tetrasodium pyrophosphate. The bath is then heated to the boil at 1.67°C. per minute and boiled 30 minutes. The scoured fabric is then rinsed with hot water.

The scoured fabrics are then dyed separately. Two dye baths are prepared by adding 1% owf wetting agent to water at 37.8°C. and adjusting the pH of one bath to 3.0 with phosphoric acid and adjusting the pH of the other to 5.0 with phosphoric acid or tetrasodium pyrophosphate as required. The scoured fabrics are then added to the dye baths and heated at 37.8°C. for 5 minutes with agitation. Then 4% owf of C.I. Acid Blue 25 (C.I. 62055) is added and the temperature is raised to 71.1°C. at 1.67°C. per minute and 20% owf of dye carrier is added to the bath. The bath temperature is raised to 76.7°C. and 30% owf of benzoic acid which functions as a cocarrier, is added. The bath is then raised to 121.1°C. at 1.67°C. per minute in a pressure dyer and maintained at 121.1°C. for 90 minutes. The dyed fabrics are then after-scoured in 2 baths prepared by adding 0.1% owf of wetting agent and 0.5% glacial acetic acid to water at 37.8°C. The scour baths are then heated to 82.2°C. at 1.67°C. per minute and maintained at 82.2°C. for 30 minutes. The fabrics are thoroughly rinsed with unheated tap water and dried. Both fabrics dye to a dark shade of blue.

EXAMPLE 2

The example illustrates the use of PHP-10.1EO to modify 3 different polyester compositions in the preparation of acid-dyeable polyester filaments.

A. Modification of Poly(ethylene terephthalate)

In a 2-liter, round-bottomed flask are placed 500 grams of di(2-hydroxyethyl) terephthalate and 0.28-gram of antimony oxide catalyst suspended in 20 milliliters of ethylene glycol and 0.3-gram of manganese hydrogen phosphate. The flask is alternately evacuated to < 2 torr and filled with nitrogen to atmospheric pressure five times. The flask is lowered into a salt bath at 245°C. and, when the monomer is molten, vacuum is applied to cause distillation of ethylene glycol. (The loss of some di(2-hydroxyethyl) terephthalate at this point is unavoidable.) When the pressure has been reduced to < 1 torr, the vacuum is broken with nitrogen, and 27.4 grams of PHP-10.1EO is added. The pressure is again reduced to < 1 torr and the temperature is raised to 285°C. in about 0.5-hour. After 1 hour at 285°C. and at < 1 torr, the vacuum is broken with nitrogen and the polymer is allowed to cool.

The polymer is then broken up, cut to flake, and solid-phase polymerized for 5 days.

The flake is spun into a 17-filament yarn at a pack-block temperature of 259°C. and a spinneret temperature of 261°C. The yarn polymer has a relative viscosity of 14.1. The yarn is drawn 4.8X in two stages. The yarn passes from a feed roll at 18.4 yards (16.8 meters) per minute, over a pin having a temperature of 80°C. at 58.5 yards (53.5 meters) per minute, over a heated plate maintained at 96°C. at 98.9 yards (90.4 meters) per minute and is then wound up at 98.4 yards (90.0 meters) per minute. The yarn has a denier of 47, a tenacity of 3.2 grams per denier, and an elongation of 30%. Three yarns prepared as above are plied together and knit into fabric. The yarn polymer contains 0.145% nitrogen.

The fabric is scoured for 30 minutes at the boil in a bath containing 1% of wetting agent and 1% of tetrasodium pyrophosphate and rinsed with hot water.

The fabric is dyed in baths having a pH of 3.0, 4.5, and 6.0 at 121°C. in a pressure dyer with dye carrier. Each bath contains 2% owf of C.I. Acid Blue 25 (C.I. 62055) and 15% owf of dye carrier. The fabrics are held in the baths for 90 minutes. The dyed fabrics are scoured 30 minutes at 82°C. in a bath containing, by weight, 1% of the wetting agent and 0.5% acetic acid. The fabrics all dye to a deep blue shade.

A second set of dyeings are made as described above, except that the temperature is about 100°C. Again, all fabrics are dyed to a deep blue shade.

B. Modification of Poly(tetramethylene terephthalate)

A mixture of 75 grams of polytetramethylene terephthalate, as flake with a relative viscosity of 51.3, and 2.74 grams of PHP-10.1EO is placed in a test tube, and the tube evacuated and filled with nitrogen 5 times. The tube is equipped with a rubber stopper. A stainless steel tube passes through the center of the stopper and carries a short section of rubber tubing at its top. The rubber tubing is lubricated with mineral oil and is passed over the shaft of a helical stirrer. The stopper also carries a second stainless steel tube for the passage of gas. The polymer is melted and the mixture is stirred 0.25-hour at 265° to 270°C. under nitrogen at atmospheric pressure. The pressure is then reduced to < 1.5 torr and stirring is continued 1 hour at 265° to 270°C. The vacuum is broken with nitrogen. The polymer is cooled, cut to flake and solid-phase polymerized for 6 days.

The flake is then spun into a 5-filament yarn at a pack-block temperature of 235°C. and a spinneret temperature of 240°C. The filaments have a relative viscosity of 17.4 and contain 0.07% nitrogen.

The yarn is drawn 3.9X in two stages. The yarn passes from a feed roll at 21.7 yards (19.8 meters) per minute, over a pin heated at 90°C. at 50.3 yards (46 meters) per minute, over a second pin at 88°C. at 84.2 yards (77 meters) per minute and is wound up at 82.5 yards (75.4 meters) per minute. The resulting yarn has a denier of 26, a tenacity of 2.2 grams per denier and an elongation of 37.8%. The yarn is knit into fabric.

The fabric is scoured and pressure dyed as described in "A" above, using dye baths at pH 3.0 and 4.5. Both fabrics dye a deep blue with the lower pH giving a somewhat darker shade.

C. Modification of a Terephthalate/Adipate Copolymer

Polymer is prepared as described above for the modification of poly(tetramethylene terephthalate), except that the flake is an ethylene terephthalate copolmer containing adipate units equivalent to 5.5% adipic acid and having a relative viscosity of 25.9. The polymer is cooled, cut to flake and solid-phase polymerized for 5 days.

The flake is then spun into a 5-filiment yarn at a pack-block temperature of 263°C. and a spinneret temperature of 264°C. The filaments have a relative viscosity of 21.7 and contain 0.12% nitrogen.

The yarn is drawn 4.5X in two stages. The yarn passes from a feed roll at 21.7 yards (19.8 meters) per minute, over a pin heated at 83°C. at 50 yards (46 meters) per minute, over a plate heated at 98°C. at 98 yards (89.6 meters) per minute and wound up at 96 yards (87.8 meters) per minute. The drawn yarn has a denier of 77, a tenacity of 2.3 grams per denier and an elongation of 24.1%. This yarn is knit into fabric.

The fabric is scoured and pressure dyed as in "A" above. Dyeings are made at pH 3.0 and 4.5 and both fabrics are dyed a deep blue.

EXAMPLE 3

This example illustrates the use of PHP-20EO in the preparation of acid-dyeable polyester filaments. Modified homopolymer and copolymer filaments are exemplified.

A. Modification of Poly(ethylene terephthalate)

A supply of di(2-hydroxyethyl) terephthalate is prepared by ester exchange of dimethyl terephthalate, ethylene glycol and a solution containing $Mn(C_2H_3O_2)_2 \cdot 4H_2O$ and $Sb_2O_3$. After methanol is removed, a solution of phosphoric acid in ethylene glycol is added. A portion equivalent to 450 grams of polyethylene terephthalate is partially polymerized by heating at 280° to 286°C. while reducing the pressure to 1 torr over a period of 3 hours and 22 minutes. The vessel is pressurized to atmospheric pressure with nitrogen and 28.17 grams of PHP-20EO is added. After stirring 6 minutes, polymerization is continued for 1 hour and 5 minutes at 0.8- to 0.2-torr at 277° to 285°C. The vessel is pressurized with nitrogen, removed from the heating medium, and cooled under nitrogen. The product is ground to 20 mesh (hole size of 1.3 millimeters on each side) and solid-phase polymerized at 0.2-torr at 204° to 210°C. for 35 hours. The relative viscosity is 23.4.

This product is spun to a 14-filament yarn at a 260°C. block temperature with a windup speed of 149 yards (136.2 meters) per minute. The filaments have a relative viscosity of 15 and contain 0.067% nitrogen. The yarn is drawn 4.2X at 100 yards (91.4 meters) per minute from feed rolls at 64°C. while passing over an annealing plate heated at 90°C. to draw rolls heated at 122°C.

After relaxing at 180°C. for 5 minutes, the yarn has a tenacity of 1.35 and an elongation of 33%. The yarn is dyed 90 minutes at 100°C. at pH 4.0, using 10% on weight of yarn (owy) diphenyl as a carrier and 3% owy of Acid Blue 40 (C.I. 62125). The bath-to-yarn weight ratio is about 100:1. The yarn dyes to a medium-dark shade of blue.

B. Modification of Terephthalate/Adipate Copolymer

In a 3-neck, round-bottomed flask equipped with stirrer, distillation head, and nitrogen inlet, is placed 450 grams of dimethyl terephthalate, 285 milliliters of ethylene glycol and, as catalysts, 0.20-gram of $Mn(C_2H_3O_2)_2 \cdot 4H_2O$ and 0.14gram $Sb_2O_3$ dissolved in 23 milliliters of ethylene glycol. The flask is heated in stages in a Wood's Metal bath until 198 milliliters of methanol is removed by distillation. Then 1.55 grams of $H_3PO_4$ (100%) dissolved in 15.9 milliliters of ethylene glycol, 23.0 grams of adipic acid, and 30.4 grams of PHP-20EO are added. The mixture is heated at atmospheric pressure for 48 minutes at a temperature of 225°–259°C. The pressure is then reduced in stages, over a period of 1 hour and 27 minutes to 0.3-torr. Polymerization is continued at 0.3-torr or less for 2 hours and 5 minutes at 259° to 264°C. The flask is pressurized with nitrogen, removed from the bath and cooled under nitrogen. The relative viscosity of this material is 7.3 The product is ground to 10 mesh and crystallized by heating 3 hours at 130°–200°C. under nitrogen, then solid-phase polymerized at 0.2-torr at 200°C., for about 16 hours. The relative viscosity is increased to 17.7.

This material is then spun to a 14-filament yarn at a block temperature of 249°C. at a windup speed of 119 yards (108.8 meters) per minute. The yarn has a relative viscosity of 14.4 and contains 0.057% nitrogen and 6 mole % adipate units. The yarn is drawn 5.6X with a feed roll temperature of 68°C. and a draw roll temperature of 90°C. After relaxing at 180°C. for 5 minutes, the yarn has a tenacity of 2.5 grams per denier and an elongation of 51%. The relaxed yarn dyes to a medium shade when dyed 90 minutes at 100°C. at pH 4.5 with 3% owy Acid Blue 40 (C.I. 62125), using a bath-to-yarn weight ratio of about 100.1.

Another terephthalate/adipate copolymer is modified as described below.

C. Modification of Terephthalate/Adipate Copolymer

In a stainless steel distilling pot having a drain valve in the bottom is placed 11 lbs. (5.0 kilograms) of dimethyl terephthalate, 7 lbs. 6 oz. (3.35 kilograms) of ethylene glycol and 120 milliliters glycol solution of 2.45 grams $Mn(C_2H_3O_2)_2 \cdot 4H_2O$ and 1.69 grams of $Sb_2O_3$. The mixture is heated to 240°C. over a 3 hour period during which time 1,650 grams of methyl alcohol and 750 grams of ethylene glycol are removed sequentially. The resulting monomer is drained to a stainless steel autoclave fitted with stirrer, charging port, vacuum distillation system, and extrusion valve. To the autoclave is added 285 grams of a glycol solution of di(2-hydroxyethyl) adipate (equal to 163.6 grams of adipic acid), 24 milliliters of an ethylene glycol solution of phosphoric acid containing 1.79 grams of phosphoric acid (as 100% $H_3PO_4$), and 27 milliliters of 20% $TiO_2$ in ethylene glycol. The pressure is reduced slowly over a period of about 2.5 hours to about 5 torr, then the autoclave is pressurized with inert gas (Kemp gas) and 317 grams of PHP-20EO diluted with 200 milliliters of ethylene glycol is added. The pressure is gradually reduced over a period of 0.5-hour and polymerization is then continued for about 2 hours at 225°C. at 1.3 torr. The melt is extruded, cooled, and cut to 0.25-inch (0.64-centimeter) flake. The flake has a relative viscosity of 11.1 and contains 0.077% nitrogen and 4.5 mole % adipate units.

Five similar batches are blended and subjected to solid-phase polymerization 54 hours at 210°C. with agitation and a flow of inert gas at about 32 standard cubic feet per minute at 21°C. This flake has a relative viscosity of 21.2.

The polymer is then spun into a 10-filament yarn at a block temperature of 269°–274°C. and wound on a package at 700 yards (640 meters) per minute. Fifty-seven packages are combined to a tow by creeling. The tow is passed from a series of feed rolls running at 40 feet (12.2 meters) per minute to a series of draw rolls running at 140 feet (42.7 meters) per minute and then to a set of four rolls heated at 140°C. to anneal the tow at constant length. The feed and draw rolls are in heated baths containing a lubricating composition with the feed-roll bath being heated to 50°C. and the draw-roll bath to 70°C. The tow is then crimped in a stuffer-box crimper and relaxed free of tension for 5 minutes in a hot air oven at 180°C. The drawn, relaxed fiber has a denier per filament of 13.0.

In a similar fashion, a 50-filament yarn is spun, creeled to a tow, drawn, crimped, relaxed at 150°C. and cut to give staple fibers having a denier per filament (DPF) of 2.8.

Physical properties are shown below:

| DPF | Tenacity Grams per Denier | Elongation, % | Relative Viscosity | Crimps Per Inch (Cm.) |
| --- | --- | --- | --- | --- |
| 13 | 2.0 | 38 | 19.3 | 7.5 (3.0) |
| 2.8 | 3.7 | 35 | 19.4 | 7.7 (3.0) |

Samples of tow of both products dye to a dark shade of blue with Acid Blue 40 (C.I. 62125) at pH 3 at 100°C. without carrier, using a bath-to-sample weight ratio of about 100:1.

EXAMPLE 4

This example illustrates the use of PHP-74EO in preparing acid-dyeable polyester filaments.

In a 2-liter, three-necked flask are mixed 1000 grams of di(2-hydroxyethyl) terephthalate, 170 grams of PHP-74EO and a suspension of 0.56-gram of antimony trioxide in 40 milliliters of ethylene glycol. The charge is converted to polymer following the procedure of Example 2A, except that the vacuum is not broken after distilling off the ethylene glycol. The polymer is cut to flake and solid-phase polymerized for 5 days. The polymer is then spun to a 17-filament yarn at a pack-block temperature of 273°C. and a spinneret temperature of 273°C. The yarn polymer has a relative viscosity of 20.6, and contains 0.12% nitrogen.

The yarn is drawn 4.66X is two stages. The yarn passes from a feed roll at 37.2 yards (34 meters) per minute, over a pin heated to 65°C. at 118 yards (107.9 meters) per minute, over a plate at 102°C. at 173 yards (158.2 meters) per minute and then is wound up at 170 yards (155.4 meters) per minute. The yarn has a denier of 65, a tenacity of 2.5 grams per denier and an elongation of 31%.

Three yarns produced as above are plied and knit into fabric. The fabric is scoured and dyed as in Example 2A, except that the dyeings are made at pH 4.5 and 6.0 at 100°C. Both fabrics dye to a dark blue shade.

EXAMPLE 5

This example illustrates the use of PHP-5PO-5EO in preparing acid-dyeable polyester filaments.

Polymer is prepared using the apparatus and conditions of Example 2A, except that 30 grams of PHP-5PO-5EO is added to 1000 grams of di(2-hydroxyethyl) terephthalate and 0.56-gram of antimony oxide in 40 milliliters of ethylene glycol. The polymer is cut to flake and solid-phase polymerized for 6 days.

The polymer is then spun into a 17-filament yarn at a pack-block temperature of 270°C. and a spinneret temperature of 266°C. The yarn polymer has a relative viscosity of 18.9 and contains 0.070% nitrogen.

The yarn is drawn 4.5X in two stages. The yarn passes from a feed roll at 37.6 yards (34.4 meters) per minute, over a pin heated to 70°C. at 118 yards (107.9 meters) per minute and over a plate heated to 90°C. at 168 yards (153.6 meters) per minute and is wound up at 163 yards (149.0 meters) per minute. The yarn has a denier of 51, a tenacity of 4.1 grams per denier and an elongation of 21%. Three yarns prepared as above are plied and knit into fabric.

The fabric is scoured and pressure dyed as described in Example 2A. Dyeings are carried out at pH values of 3.0 and 4.5 and both fabrics dye to a deep shade of blue.

EXAMPLE 6

This example illustrates the use of PHP-5EO-5PO in preparing acid-dyeable polyester filaments. Modified homopolymer and copolymer filaments are exemplified.

A. Modification of Poly(ethylene terephthalate)

Polymer is prepared using the apparatus and conditions of Example 2A, except that 31.6 grams of PHP-5EO-5PO is added to 1000 grams of monomer and 0.56-gram of antimony oxide in 40 milliliters of ethylene glycol. The polymer is cut to flake and solid-phase polymerized for 7 days.

The polymer is spun into a 17-filament, 218-denier yarn at a pack-block temperature of 284°C. and a spinneret temperature of 284°C. The filaments have a relative viscosity of 18.3.

The yarn is drawn 4.15X is two stages. The yarn passes from a feed roll at 20 yards (18.3 meters) per minute, over a pin heated at 68°C. at 50 yards (45.7 meters) per minute, over a plate heated at 75°C. at 83.4 yards (76.3 meters) per minute and wound up at 82 yards (75 meters) per minute. The yarn has a denier of 54, a tenacity of 2.7 grams per denier, an elongation of 37.3% and a nitrogen content of 0.04%. Three yarns prepared as above are plied and knit into a fabric.

The fabric is scoured and pressure dyed, using the procedures described in Example 2A. Dyeings are made at pH 3.0 and 4.5. The fabric dyed at pH 3.0 is a deep blue and the one at 4.5 is a medium blue.

B. Modification of Terephthalate/Adipate Copolymer

Polymer is prepared as described in Example 2B, except the flake is an ethylene terephthalate copolymer containing adipate units equivalent to 5.5% adipic acid and having a relative viscosity of 25.9, and 3.16 grams of PHP-5EO-5PO are used. The polymer is cut to flake and solid-phase polymerized for 5 days.

The flake is spun into a 5-filament yarn at a pack-block temperature of 270°C. and a spinneret temperature of 262°C. The yarn has a relative viscosity of 23.4 and contains 0.085% nitrogen.

The yarn is drawn 4.5X as described in Example 2C. The drawn yarn has a denier of 16, a tenacity of 3.8 grams per denier and an elongation of 17.8%.

The yarn is skeined and the skeins scoured and pressure dyed as in Example 2A. Dyeings are made at pH 3.0 and 4.5. Both fabrics dye to a deep shade with the dyeing at pH 3.0 being noticeably darker.

EXAMPLE 7

This example illustrates the use of PHP-5EO/5PO (random mixture of oxyethylene and oxypropylene units) in preparing acid-dyeable polyester filaments.

Polymer is prepared as in Example 2A using 1000 grams of monomer and 0.56-gram of antimony oxide in 40 milliliters of ethylene glycol. PHP-5EO/5PO, 31.2 grams, is added after the vacuum is broken following the distillation of the ethylene glycol.

The polymer is cut to flake and solid-phase polymerized for 6 days. The polymer is then spun into a 17-filament yarn at a pack-block temperature of 272°C. and a spinneret temperature of 268°C. The yarn polymer has a relative viscosity of 19.0 and contains 0.055% nitrogen.

The yarn is drawn 4.5X in two stages. The yarn passes from a feed roll at 18.6 yards (17.0 meters) per minute, over a pin heated to 82°C. at 54 yards (49.4 meters) per minute, over a plate heated to 95°C. at 84 yards (76.8 meters) per minute and is wound up at 83.6 yards (76.4 meters) per minute. The yarn has a denier of 50, a tenacity of 3.8 grams per denier and an elongation of 23%. Three yarns are produced as above and are plied and knit into fabric.

The fabric is scoured and pressure dyes using the procedures described in Example 2A. Dyeings are made at pH 3.0 and 4.5. The fabric dyed at pH 3.0 is dyed to a deep shade and the one at 4.5 is dyed a light-medium shade of blue.

EXAMPLE 8

This example illustrates the use of BTHP-14EO in preparing acid-dyeable polyester filaments.

Polymer is prepared using the amounts and conditions specified in Example 2A, except that 1000 grams of di(2-hydroxyethyl) terephthalate is used, the catalyst is 2 grams of tetrabutyl titanate, no manganese hydrogen phosphate is used, and 35 grams of BTHP-14EO is added to the melt. The polymer flake is solid-phase polymerized at 185°C. for 7 days at 5 torr. The polymer contains 0.08% nitrogen.

The polymer is spun to a 17-filament yarn at a pack-block and spinneret temperature of 276°C. The yarn polymer has a relative viscosity of 22.7. The yarn is drawn 4.3X in two stages. The yarn passes from a feed roll at 20.2 yards (18.5 meters) per minute, over a pin heated to 67°C. at 48.4 yards (44.2 meters) per minute, over a heated plate maintained at 98°C. at 86.7 yards (79.3 meters) per minute and is wound up at 86.2 yards (78.8 meters) per minute. The yarn has a denier of 52, a tenacity of 4.0 grams per denier and an elongation of 25%. The yarn is knit into fabric.

The fabric is scoured and pressure dyed using the procedures described in Example 2A. Dyeings are made at pH 3.0 and 4.5. The fabric dyed at pH 3.0 dyes to a deep shade and the one at 4.5 to a light-medium shade of blue.

EXAMPLE 9

This example illustrates the use of ETMP-19EO in preparing acid-dyeable polyester filaments. Modified homopolymer and copolymer filaments are exemplified.

A. Modification of Poly(ethylene terephthalate)

Polymer is made as described in Example 2A, except that 1000 grams of monomer, 0.56-gram of antimony oxide in 40 milliliters of ethylene glycol and 46.4 grams of ETMP-19EO are used. The polymer is cut into flake and solid-phase polymerized for 6 days. It is then spun into a 17-filament yarn at a pack-block temperature of 266°C. and a spinneret temperature of 270°C. The yarn polymer has a relative viscosity of 19.6 and contains 0.095% nitrogen.

The yarn is drawn 3.2X in two stages. The yarn passes from a feed roll at 53.8 yards (49.2 meters) per minute, over a pin heated to 72°C. at 162 yards (148 meters) per minute, over a plate heated to 80°C. at 166 yards (152 meters) per minute and is then wound up to 162 yards (148 meters) per minute. The yarn has a denier of 67, a tenacity of 2.6 grams per denier and an elongation of 13%.

Three yarns prepared as above are plied and knit into fabric. A portion of the fabric is scoured and pressure dyed using the procedures described in Example 2A. Dyeings are made at pH values of 3.0 and 4.5, and the fabrics dye to a deep shade of blue.

B. Modification of a Terephthalate/Adipate Copolymer

Polymer is prepared as described in Example 2B, except that the flake is an ethylene terephthalate copolymer containing adipate units equivalent to 5.5% adipic acid and having a relative viscosity of 25.9 and 4.6 grams of ETMP-19EO are used. The polymer is cooled, cut to flake and solid-phase polymerized for 5 days.

The polymer is then spun into a 5-filament yarn at a pack-block temperature of 275°C. and a spinneret temperature of 260°C. The filaments have a relative viscosity of 36.1 and contain 0.075% nitrogen.

The yarn is drawn 4X in two stages as described in Example 2C, except that the speed over the hot plate is 87.5 yards (80 meters) per minute and the yarn is wound up at 86 yards (78.6 meters) per minute. The drawn yarn has a denier of 28, a tenacity of 2.8 grams per denier and an elongation of 6.6%.

The yarn is skeined. The skein is scoured and pressure dyed using the procedures described in Example 2A. The dyeing is at pH 3.0 and the skein dyes to a deep shade.

EXAMPLE 10

This example illustrates a preferred method for preparing the acid-dyeable polyester fibers and dyeing them in a multi-dye bath.

A molten stream of PHP-20EO having a temperature of 120°–130°C. is injected continuously into a molten stream of polyethylene terephthalate having a relative viscosity of 3–5. Injection is at such a rate as to provide 0.075% nitrogen in the final polymer. The combined ingredients are then passed into a finisher vessel held at 275°C. and 1.3 torr. Into the finisher vessel near its mid-point is injected 2.2%, based on final polymer weight, of diphenyl terephthalate to accelerate the polymerization. The flow of the polymer out of the finisher is controlled to give a holdup time of about two hours. The finisher polymer has a relative viscosity of 20 and is spun at 274° through a 360-hole spinneret (orifice diameter 0.381 millimeter) to produce filaments which are collected as a yarn at 900 yards (825 meters) per minute. A creel stock is prepared from 25 of these yarns and the yarns are combined to form a tow which is drawn at a draw ratio of 4. The tow is drawn at 100 yards (92 meters) per minute in an aqueous draw bath at 80°C. The tow is then crimped, relaxed and cut to staple fibers. The copolyester fibers have a denier of about 3.4, a tenacity of 4.0 grams per denier, and an elongation of 23%.

These fibers are then spun into a yarn, as are commercial fibers prepared from a basic-dyeable copolyester and commercial fibers prepared from poly(ethylene terephthalate). The basic-dyeable copolyester is prepared from ethylene glycol, terephthalic acid (98 mole percent of acid units) and sodium 3,5-di(carbomethoxy) benzene sulfonate (2 mole percent of acid units) in accordance with the teaching of U.S. Pat. No. 3,018,272 issued to Griffing and Remington. The fibers are spun into three separate singles yarns on the midfiber spinning system to give yarns having a cotton count of 21 and 18 turns of Z twist. The yarns are knit into a fabric on a Lawson knitting machine. The fabric has three bands of approximately equal width, with each of the above yarns being knit into a separate band. A 5-gram swatch of this fabric containing approximately the same amount of each of the above yarns is scoured and dyed in a Size 14 Gaston County Pressure Dyeing Machine using the following procedure, where the percentages are based on weight of fabric:

The fabric is scoured 20 minutes at 82.2°C. in a bath containing 1% of a non-ionic surfactant based on the ethylene oxide condensate of a long chain linear alcohol and 1% of tetrasodium phosphate. The fabric is then rinsed well. The rinsed fabric is then placed in a set bath having a temperature of 37.8°C. Then 1% of the non-ionic surfactant described above, 1% of an amphoteric dyeing assistant based on the ethylene oxide adduct of a fatty amine, sodium sulfate and sodium formate are added. The sulfate is added to give 6 grams per liter and the formate 4 grams per liter. The bath is then agitated for 5 minutes and 20% of dye carrier added, the bath agitated another 5 minutes and 0.15% C.I. Basic Blue 77, 0.35% C.I. Basic Blue 87 and 0.05% C.I. Basic Red 15 added. The bath is then agitated 5 minutes and 0.2% C.I. Disperse Yellow 54 (C.I. 47020) is added and the bath agitated another 5 minutes and the pH readjusted to 3.5 with formic acid. The bath is then heated to 76.7°C. at 1.1°C. per minute. Then 0.17% C.I. Acid Red 151 (C.I. 26900) and 0.25% C.I. Acid Orange 128 is added and the bath agitated 5 minutes. The pH of the bath is then readjusted to 3.5 and the bath temperature increased to 87.8°C. at 1.1°C. per minute and the dyer sealed. The temperature is then raised to 121.1°C. at 1.7°C. per minute and the bath agitated for 2 hours at 121.1°C. The dye bath is allowed to cool to 71.1°C. and the fabric rinsed well in hot tap water. The dyed fabric is then scoured 20 minutes at 71.1°C. in a bath containing 1% of the non-ionic surfactant described above. The fabric is rinsed in hot tap water and then dried. The dyed fabric is then heat set for 1 minute at 176.7°C. in a Laboratory High Temperature Oven (Electric Hotpack Corp., Philadelphia, Pennsylvania) and then removed and the heat setting step repeated. The poly(ethylene terephthalate) fibers are dyed yellow, the basic-dyeable polyester fibers are dyed blue and the fibers of this invention are dyed red.

We claim:

1. Acid-dyeable textile fibers or filaments of polyester containing a minor proportion, sufficient to provide at least 0.02 weight percent nitrogen, of 2,2,6,6-tetramethylpiperidine groups attached through oxyalkylene linkages to carboxylate units at the ends of polyester chains, said linkages being through the 1 or 4 positions of the tetramethylpiperidine ring, the oxyalkylene linkages consisting of oxyethylene or oxyethylene and oxypropylene, and there being an average of at least about 10 oxyalkylene units per tetramethylpiperidine group of which at least 5 are oxyethylene units.

2. Fibers or filaments as defined in claim 1 wherein the polyester comprises at least 85 mole percent ethylene terephthalate units.

3. Fibers or filaments as defined in claim 2 wherein said polyester contains alkylene oxide condensates of a 1-alkyl-2,2,6,6-tetramethyl-4-hydroxypiperidine, linked to terephthalate units at the ends of polyester chains, said 1-alkyl group having 1 to 4 carbon atoms.

4. Fibers or filaments as defined in claim 2 wherein said polyester contains alkylene oxide condensates of a 1-hydroxyalkyl-2,2,6,6-tetramethylpiperidine, linked to terephthalate units at the ends of polyester chains, said 1-hydroxyalkyl group having 1 to 4 carbon atoms.

5. Fibers or filaments as defined in claim 2 wherein the polyester comprises 2 to 10 weight percent ethylene adipate units.

6. Fibers or filaments as defined in claim 1 wherein the 2,2,6,6-tetramethylpiperidine groups provide 0.02 to 0.25 weight percent nitrogen, based on the weight of the modified polyester.

7. Fibers or filaments as defined in claim 1 wherein there are an average of 10 to 80 oxyalkylene units per tetramethylpiperidine group.

8. Fibers or filaments as defined in claim 1 wherein there are an average of 10 to 40 oxyalkylene units per tetramethylpiperidine group.

9. Fibers or filaments as defined in claim 1 wherein 2,2,6,6-tetramethylpiperidine groups are attached to said carboxylate units through the 4-position of the tetramethylpiperidine ring.

10. Fibers or filaments as defined in claim 1 wherein the polyester comprises at least 85 mole percent ethylene terephthalate units and contains oxyethylene condensates of 1,2,2,6,6-pentamethyl-4-hydroxypiperidine linked to terephthalate units at the ends of polyester chains, there being an average of about 20 oxyethylene units per pentamethylpiperidine group.

* * * * *